(12) United States Patent
Chandra et al.

(10) Patent No.: US 11,509,159 B2
(45) Date of Patent: Nov. 22, 2022

(54) SYSTEM AND METHOD FOR THERMAL CUTOFF PROTECTION DEVICE CONTROL FROM AN EXTERNAL COMPONENT

(71) Applicant: Microsoft Technology Licensing, LLC, Redmond, WA (US)

(72) Inventors: Sachin Ramesh Chandra, Woodinville, WA (US); Jason Michael Battle, Kenmore, WA (US); Benjamin Edward Newton, Anacortes, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 16/554,027

(22) Filed: Aug. 28, 2019

(65) Prior Publication Data
US 2021/0066943 A1 Mar. 4, 2021

(51) Int. Cl.
*H02J 7/00* (2006.01)
*G06F 1/20* (2006.01)
(Continued)

(52) U.S. Cl.
CPC ............ *H02J 7/0091* (2013.01); *G06F 1/206* (2013.01); *H01H 37/54* (2013.01); *H02H 3/025* (2013.01);
(Continued)

(58) Field of Classification Search
CPC .................................................. H01H 37/761
See application file for complete search history.

(56) References Cited

U.S. PATENT DOCUMENTS

| 2,272,021 A * | 2/1942 | Riche ..................... H01H 37/66 337/344 |
| 3,378,658 A * | 4/1968 | Arlin ..................... H01H 37/70 337/54 |

(Continued)

FOREIGN PATENT DOCUMENTS

| CN | 202586297 U | 12/2012 |
| EP | 2811548 A1 | 12/2014 |
| KR | 20150069136 A | 6/2015 |

OTHER PUBLICATIONS

"Battery Protection Methods", Retrieved from https://web.archive.org/web/20040829234057/https:/www.mpoweruk.com/protection.htm, Aug. 29, 2004, 3 Pages.

(Continued)

*Primary Examiner* — Drew A Dunn
*Assistant Examiner* — Tynese V McDaniel
(74) *Attorney, Agent, or Firm* — Ray Quinney & Nebeker P.C.; Paul N. Taylor

(57) ABSTRACT

A device for controlling battery operation includes a battery cell, a thermal cutoff, and a battery management system. The thermal cutoff is coupled in series between the battery cell and a system load of the device. The thermal cutoff has at least three terminals. A first terminal of the thermal cutoff is electrically-coupled to the battery cell and a second terminal of the thermal cutoff is electrically-coupled to the system load. The thermal cutoff includes a permanent failure mechanism having an open state and closed state wherein the closed state allows electrical communication between the first terminal and the second terminal. The battery management system is electrically-coupled to a third terminal of the thermal cutoff. The permanent failure mechanism permanently switches to the open state in response to an electrical signal from the battery management system.

21 Claims, 6 Drawing Sheets

(51) Int. Cl.
    *H02H 3/02*        (2006.01)
    *H01H 37/54*       (2006.01)
(52) U.S. Cl.
    CPC .......... *H02J 7/0021* (2013.01); *H02J 7/0029* (2013.01); *H02J 7/00304* (2020.01); *H02J 7/00308* (2020.01); *H02J 7/00309* (2020.01); *H02J 7/007194* (2020.01); *H01H 2037/5463* (2013.01)

(56) References Cited

U.S. PATENT DOCUMENTS

| | | | | |
|---|---|---|---|---|
| 3,760,310 | A * | 9/1973 | Carson | H01H 37/58 335/146 |
| 4,039,993 | A * | 8/1977 | Kerr | H01H 37/58 337/366 |
| 4,383,231 | A * | 5/1983 | Yamanaka | H01H 37/58 335/146 |
| 4,414,519 | A * | 11/1983 | Anderson, III | H01H 37/58 335/146 |
| 4,434,411 | A * | 2/1984 | Anderson, III | H01H 37/58 335/146 |
| 4,821,010 | A | 4/1989 | Plasko | |
| 5,550,525 | A * | 8/1996 | Place | H01H 37/52 337/344 |
| 5,691,073 | A * | 11/1997 | Vu | H01M 50/3425 429/7 |
| 5,760,676 | A * | 6/1998 | Yamada | H01H 37/76 338/234 |
| 5,825,278 | A * | 10/1998 | Reid | H01H 37/764 337/407 |
| 7,242,566 | B2 | 7/2007 | Yegin et al. | |
| 7,737,816 | B1 * | 6/2010 | Yu | H01H 37/002 337/142 |
| 7,750,788 | B2 * | 7/2010 | Yu | H01H 37/002 337/142 |
| 7,791,448 | B2 * | 9/2010 | Yu | H01H 37/002 337/142 |
| 7,808,361 | B1 * | 10/2010 | Yu | H01H 37/5418 337/142 |
| 8,902,037 | B2 * | 12/2014 | Ueda | H01H 1/02372 337/298 |
| 8,902,038 | B2 * | 12/2014 | Ueda | H01H 37/5427 337/298 |
| 9,099,761 | B2 * | 8/2015 | Hong | |
| 9,385,362 | B2 | 7/2016 | Ahn et al. | |
| 9,548,177 | B2 * | 1/2017 | Hou | H01H 37/761 |
| 10,199,632 | B2 * | 2/2019 | Johler | H01M 50/502 |
| 2001/0011650 | A1 * | 8/2001 | Pohl | H01H 89/06 218/22 |
| 2002/0153991 | A1 * | 10/2002 | Haeusel | H01H 37/761 337/404 |
| 2003/0152830 | A1 * | 8/2003 | Eaves | |
| 2004/0100354 | A1 * | 5/2004 | Davis | H01H 37/5409 337/356 |
| 2004/0150504 | A1 * | 8/2004 | Nicholson | H01H 37/58 337/54 |
| 2006/0076923 | A1 * | 4/2006 | Eaves | G01T 1/249 320/112 |
| 2006/0250209 | A1 * | 11/2006 | Yu | H01H 37/002 337/36 |
| 2007/0289948 | A1 * | 12/2007 | Shinohara | H01H 61/02 218/6 |
| 2008/0117016 | A1 * | 5/2008 | Yu | H01H 37/761 337/401 |
| 2012/0194317 | A1 | 8/2012 | Vranicar et al. | |
| 2015/0179371 | A1 * | 6/2015 | Hashimoto | H01H 85/463 200/329 |
| 2015/0294825 | A1 * | 10/2015 | Zhou | H01H 50/24 335/41 |
| 2016/0042904 | A1 * | 2/2016 | Hou | |
| 2016/0254522 | A1 * | 9/2016 | Johler | |
| 2018/0040443 | A1 * | 2/2018 | Yokota | H02H 3/085 |
| 2019/0198277 | A1 | 6/2019 | Mctigue et al. | |
| 2021/0066016 | A1 * | 3/2021 | Tada | H02J 7/0014 |

OTHER PUBLICATIONS

"Keeping Higher Current Lithium-ion Battery Cells Safe with Effective Overtemperature Protection", In White Paper of Bourns, Retrieved Date: Jun. 11, 2019, 9 Pages.

"International Search Report and Written Opinion Issued in PCT Application No. PCT/US20/038580", dated Oct. 2, 2020, 16 Pages.

* cited by examiner

SYSTEM AND METHOD FOR THERMAL CUTOFF PROTECTION DEVICE CONTROL FROM AN EXTERNAL COMPONENT

BACKGROUND

Background and Relevant Art

Electronic devices utilize rechargeable batteries to provide mobile power to the device. A rechargeable battery experiences many charge and discharge cycles throughout the lifetime of the battery. The charge and discharge cycles can degrade the battery and/or cells of the battery, and abnormal charge or discharge (e.g., overcharging without a protection mechanism) can damage the battery and/or cells. A damaged battery or cells can potentially catch fire or burn the electronic device or a user. Modern batteries have various safety mechanisms to restrict or terminate current flow through the battery to prevent or stop a battery from exploding.

BRIEF SUMMARY

Rechargeable batteries include a number of safety mechanisms. The safety mechanisms can prevent fires, explosions, burns, or simply degradation of the battery performance. The safety mechanisms can introduce impedance into the battery circuit, adversely affecting the performance of the battery at all times irrespective of whether the safety mechanisms are ever activated. Additionally, some safety mechanisms open the entire battery circuit and terminate current flow when an undesired condition is detected anywhere in the battery. In some embodiments, a battery circuit according to the present disclosure allows for permanent failure safety mechanisms in individual portions of the battery circuit and/or reducing impedance in the battery circuit.

In some embodiments, a device for controlling battery operation includes a battery cell, a thermal cutoff, and a battery management system. The thermal cutoff is coupled in series between the battery cell and a system load of the device. The thermal cutoff has at least three terminals. A first terminal of the thermal cutoff is electrically-coupled to the battery cell and a second terminal of the thermal cutoff is electrically-coupled to the system load. The thermal cutoff includes a permanent failure mechanism having an open state and closed state wherein the closed state allows electrical communication between the first terminal and the second terminal. The battery management system is electrically-coupled to a third terminal of the thermal cutoff. The permanent failure mechanism permanently switches to the open state in response to an electrical signal from the battery management system.

In some embodiments, a method for controlling electricity supply in a battery includes providing an electrical current through a circuit in a thermal cutoff device of the battery, detecting an undesired condition of the battery, and activating a permanent failure mechanism of the thermal cutoff device so as to open the circuit in response to the undesired condition of the battery.

In some embodiments, a device for controlling battery operation includes a first battery cell, a second battery cell, a first thermal cutoff, and a second thermal cutoff. The first thermal cutoff is coupled in series between the first battery cell and a system load of the device. The first thermal cutoff has at least three terminals. A first terminal of the thermal cutoff is electrically-coupled to the battery cell and a second terminal of the thermal cutoff is electrically-coupled to the system load. The first thermal cutoff includes a first permanent failure mechanism having an open state and closed state wherein the closed state allows electrical communication between the first terminal and the second terminal. The second thermal cutoff is coupled in series between the second battery cell and the system load of the device. The second thermal cutoff has at least three terminals. A first terminal of the second thermal cutoff is electrically-coupled to the second battery cell and a second terminal of the second thermal cutoff is electrically-coupled to the system load. The second thermal cutoff includes a second permanent failure mechanism having an open state and closed state wherein the closed state allows electrical communication between the first terminal and the second terminal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a schematic representation of a PFTCO in an inactive state, according to at least one embodiment of the present disclosure;

FIG. 3-2 is a schematic representation of the PFTCO of FIG. 3-1 with a temporary failure mechanism in an active state, according to at least one embodiment of the present disclosure;

FIG. 3-3 is a schematic representation of the PFTCO of FIG. 3-1 with a permanent failure mechanism in an active state, according to at least one embodiment of the present disclosure;

FIG. 7-1 is a schematic representation of a PFTCO with a deployable catch in a permanent failure mechanism, according to at least one embodiment of the present disclosure;

FIG. 7-2 is a schematic representation of the PFTCO of FIG. 7-1 with the deployable catch engaged with a temporary failure mechanism, according to at least one embodiment of the present disclosure;

DETAILED DESCRIPTION

The present disclosure relates generally to devices, systems, and methods for safely providing electricity from a battery. More particularly, the present disclosure relates to improving efficiency in the battery circuit design while increasing flexibility of the safety capabilities of the battery circuit.

Figure 1:
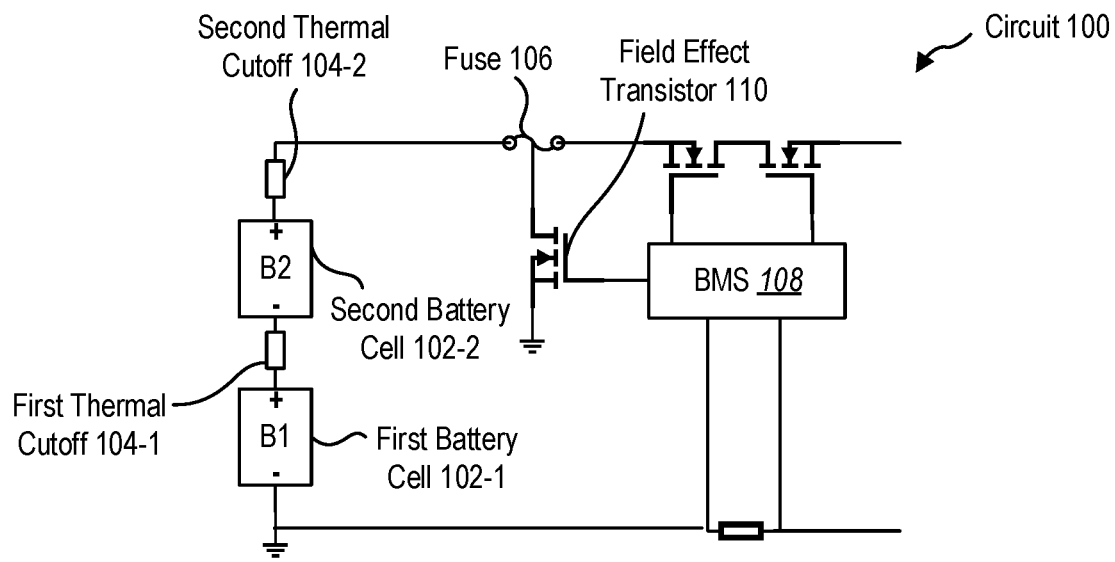
FIG. 1 is a circuit diagram of a battery circuit including a plurality of thermal cutoff devices in series with battery cells and a main fuse.

FIG. 1 illustrates an example of a conventional battery design. In FIG. 1, a battery circuit 100 includes a plurality of battery cells 102-1, 102-2, and two-terminal components called a thermal cutoff (TCO) 104-1, 104-2 that are connected in electrical series after each battery cell 102-1, 102-2. A first TCO 104-1 is located after the first battery cell 102-1 and connected to a tab welding point of the first battery cell 102-1 at the respective printed circuit board pad, and a second TCO 104-2 is located after the second battery cell 102-2 and connected to a tab welding point of the second battery cell 102-2 at the respective circuit board pad.

A rise in temperature can trigger TCO activation. The rise in temperature can either be due to high temperature of the battery cell, an overcurrent condition of the battery cell, or a combination of temperature and overcurrent condition. The TCOs 104-1, 104-2 are used on battery cells 102-1, 102-2 to comply with the battery safety standards. Along with the TCOs 104-1, 104-2, the circuit 100 also contains a 3-terminal main fuse 106 in series with the plurality of battery cells 102-1, 102-2. The main fuse 106, when triggered, will permanently open the circuit path between the battery cells 102-1, 102-2 and the remainder of the electronic device comprising the circuit 100 to stop current flow through the battery and device.

The main fuse 106 may be triggered when there is an undesired or unsafe condition as detected by the battery management system (BMS) 108. For example, the undesired condition could be an overvoltage condition, an overcurrent condition, a high temperature condition, another undesired condition of the circuit 100 or component of the circuit 100, or combinations thereof. The fuse trigger circuitry also contains a heater circuit which uses a N channel metal-oxide semiconductor field effect transistor (MOSFET) 110 to melt the main fuse 106 when triggered.

During the life of the battery, the main fuse 106 and heater circuitry (e.g., the BMS 108 and MOSFET 110) will be triggered one time. When not triggered, the main fuse 106 adds 3 to 5 milliohms (mohms) of series impedance to the circuit 100 always and needs the associated heater circuitry to trigger. The TCOs 104-1, 104-2 are included in multi-cell pack designs and are in series with the main fuse 106. During high charge and/or discharge conditions, the extra impedance of the main fuse 106 contributes to power loss and voltage drop.

Figure 2:
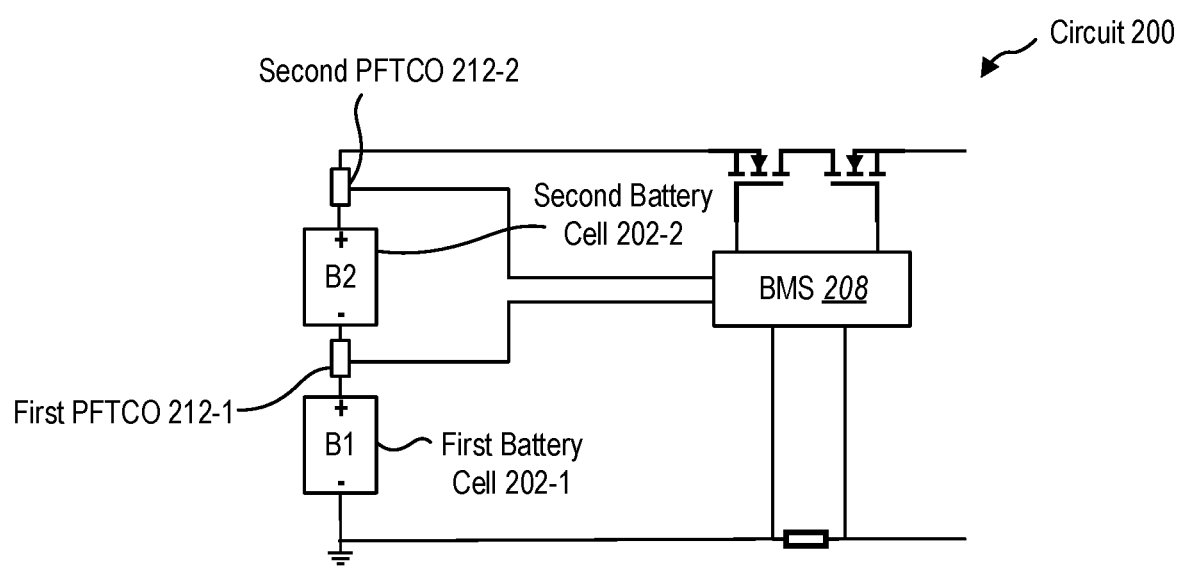
FIG. 2 is a circuit diagram of a battery circuit including a plurality of permanent failure thermal cutoff (PFTCO) devices in series with battery cells, according to at least one embodiment of the present disclosure.

In some embodiments, a TCO according to the present disclosure includes the ability for the TCO to permanently fail (PF) and open the circuit at a particular battery cell, as illustrated in FIG. 2. In some embodiments, the TCO includes a PF mechanism that can be remotely activated to PF the TCO. In some embodiments, the TCO includes a PF mechanism to PF the TCO passively without external input or commands. In some embodiments, the main fuse is eliminated, reducing the overall impedance of the circuit. For example, instead of using a three-terminal main fuse 106 in series with the battery cells 102-1, 102-2 controlled by a BMS 108, a TCO with PF capabilities can be used in communication with the BMS, achieving equivalent functionality and preserving redundancy for a full suite of protection functions. In this way, the cost and circuit board space associated with the three-terminal main fuse 106 and heater circuitry can be replaced with just a BMS and TCO.

In some embodiments, a battery includes one or more battery cells in series or parallel to provide electricity through a circuit. In some embodiments, the circuit includes two types of safety precautions that can limit and/or stop the flow of current through the circuit or a portion of the circuit. For example, the circuit can include temporary failure safety mechanisms and PF safety mechanisms. A temporary failure safety mechanism is a reversible mechanism that opens the circuit or limits current flow through the circuit when in an activated state due to a triggering condition. A PF safety mechanism is an irreversible mechanism that opens the circuit and stops current flow when in an activated state due to a triggering condition.

A triggering condition is any unsafe or undesired condition that results directly or indirectly in the activation of a safety mechanism. In some embodiments, the triggering condition is an environmental condition, such as temperature of the circuit. In some embodiments, the triggering condition is a measured condition, such as an overvoltage condition or overcurrent condition. In some embodiments, the triggering condition can be an electronic command provided by a user.

A temporary failure safety mechanism can be reset to an inactive state without disassembly of the battery or circuit and/or without replacement of any part of the battery or circuit. In some embodiments, a temporary failure safety mechanism allows for a mechanical or electrical reset of the temporary failure safety mechanism. In some embodiments, a mechanical reset includes a physical switch that is manually moved by a user to reset the temporary failure mechanism. In some embodiments, a mechanical reset includes a biasing element, such as a spring or a weight, that urges the temporary failure safety mechanism toward the inactive state. The temporary failure safety mechanism can thereby return to an inactive state once the triggering condition passes, without user interaction. In some embodiments, an electrical reset is a device or connection that allows the temporary failure safety mechanism to move back to an inactive state through the application of an electrical voltage or current. In some embodiments, an electrical reset is an electric motor, an electromagnet, a linear actuator, or other electrical device that applies a force to reset the temporary failure safety mechanism via a command sent to the electrical reset.

A PF safety mechanism cannot be reset to an inactive state without disassembly of the battery and/or circuit or without replacement of at least one component. A fuse is an example of a PF safety mechanism. In some embodiments, a PF safety mechanism is a passive PF safety mechanism that activates in the presence of a triggering condition without user intervention. In some embodiments, a PF safety mechanism is an active PF safety mechanism that is activated by a user or by an electrical command based on a sensed condition.

In some embodiments, the temporary failure safety mechanism and PF safety mechanism are integrated in a single component. In some embodiments, a TCO includes a PF safety mechanism. A permanent failure thermal cutoff (PFTCO) according to the present disclosure can include a passive PF safety mechanism and/or an active PF safety mechanism in addition to a temporary failure mechanism.

Referring now to FIG. 2, an embodiment of a battery circuit 200 includes a plurality of PFTCOs 212-1, 212-2. In some embodiments, the circuit 200 includes a first battery cell 202-1 (similar to the first battery cell 102-1 described in relation to FIG. 1) with a first PFTCO 212-1 immediately after the first battery cell 202-1 and a second battery cell 202-2 with a second PFTCO 212-2 immediately after the second battery cell 202-2. The first PFTCO 212-1 and second PFTCO 212-1 are in data communication with the BMS 208 (similar to the BMS 108 described in relation to FIG. 1) through a third terminal of the PFTCOs 212-1, 212-2. In some embodiments, the BMS 208 can read conditions of the PFTCO 212-1, 212-2. In some embodiments, the BMS 208 can send commands to the PFTCO 212-1, 212-2 to activate the PF mechanism of the PFTCO 212-1, 212-2 based on a detected undesired or unsafe condition of the battery cells 202-1, 202-2, the battery circuit 200, or other parts of the electronic device connected to the battery. In some embodiments, the BMS 208 receives operational information from the PFTCOs 212 and utilizes the operational information to determine whether to trigger a PF of the PFTCOs. For example, the BMS 208 may receive information regarding temporary failure conditions (e.g., thermal failures) from the PFTCOs 212 and determine whether to trigger a PF based on the received information and, optionally, on additional system information such as currents, voltages, temperatures, etc.

By including the PF safety mechanism in a PFTCO, a circuit-level fuse can be removed from a battery circuit 200. Removal of the circuit-level fuse in series with the battery cells 202-1, 202-2 can reduce the total impedance of the battery circuit 200 and improve efficiency of the system. In some embodiments, a circuit with battery cells and PFTCOs according to the present disclosure can allow the PF of individual battery cells or banks of battery cells without requiring the PF of the entire circuit and/or battery.

In some embodiments, the passive PF safety mechanism of a PFTCO is configured to activate without express input from a user or from a controller. In some embodiments, the passive PF safety mechanism will activate and cause a PF of the PFTCO when the passive PF safety mechanism exceeds a threshold temperature. In some embodiments, the passive PF safety mechanism will activate and cause a PF of the PFTCO when the passive PF safety mechanism exceeds a threshold current. In some embodiments, the passive PF safety mechanism will activate and cause a PF of the PFTCO when the passive PF safety mechanism exceeds a threshold voltage.

In some embodiments, the active PF safety mechanism of a PFTCO is configured to activate upon receiving a command or electrical signal from a user or controller. In some embodiments, the active PF safety mechanism will activate and cause a PF of the PFTCO when the active PF safety mechanism receives a command from a BMS. In some embodiments, the active PF safety mechanism will activate and cause a PF of the PFTCO when the active PF safety mechanism receives a command from a thermocouple or thermistor located outside of the PFTCO. In some embodiments, the active PF safety mechanism will activate and cause a PF of the PFTCO when the active PF safety mechanism receives a command from a processor of an electronic device to which the battery is connected.

In some embodiments, a PFTCO includes a temporary failure mechanism and a PF mechanism. The PF mechanism may be a PF connector that provides electrical communication when in the closed or inactive state and opens the circuit when in an open or active state. The PF connector may be before or after the temporary failure mechanism in the PFTCO. In some embodiments, the PF connector is held the closed or inactive state by a nonconductive block. The nonconductive block holds a switch of the PF connector in contact with another conductive element of the PFTCO, providing an electrical path between a first terminal of the PFTCO and a second terminal of the PFTCO.

In some embodiments, the PFTCO includes a third terminal that is in data communication with a controller, such as a BMS. The BMS can communicate with the PF mechanism through the third terminal to selectively cause a PF of the PFTCO. The temporary failure mechanism may be in communication with the BMS, also, or the temporary failure mechanism is a passive mechanism. In some embodiments, the communication between the PFTCOs and the BMS is one-way, for example, the BMS utilizes a communication line to trigger a PF. In some embodiments, the communication between the PFTCOs and the BMS is two-way, for example, the PFTCOs notify the BMS when a temporary failure has occurred and the BMS instructs the PFTCOs to trigger a PF.

In some embodiments, the temporary failure mechanism includes a bimetal disc that includes two different metals with different coefficients of thermal expansion (CTE). The different CTE of the two metals causes the bimetal disc to flex or otherwise change shape depending on a temperature of the bimetal disc. In some embodiments, the temperature of the bimetal disc is based on environmental temperature in and around the PFTCO. In some embodiments, the temperature of the bimetal disc is affected by a current flowing through the bimetal disc. For example, a portion of the current flowing between the first terminal and the second terminal may be directed through the bimetal disc of the temporary failure mechanism. The resistance of the bimetal disc may result in heating and activation of the temporary failure mechanism.

In some embodiments, the PF mechanism includes a removable block that, when removed, activates the PF mechanism and irreversibly opens the circuit. In some embodiments, the removable block is a nonconductive block that compresses a switch of the PF mechanism against a conductive member to close the circuit. The nonconductive block can be removable by a variety of methods. In some embodiments, the nonconductive block is removable by removing a compressive force holding the removable block in place, causing the nonconductive block to fall or otherwise move from the switch, allowing the switch to move and open the circuit.

Figures 1, 3:
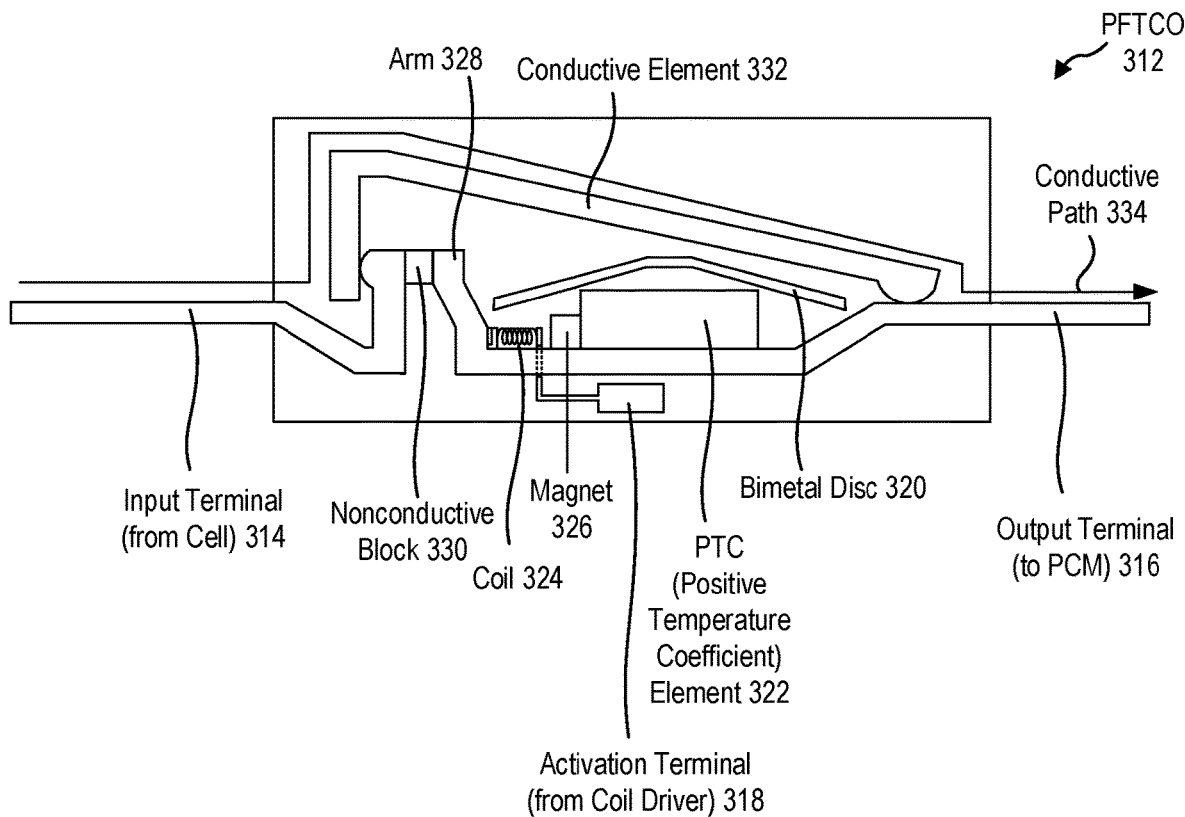
Figures 2, 3:
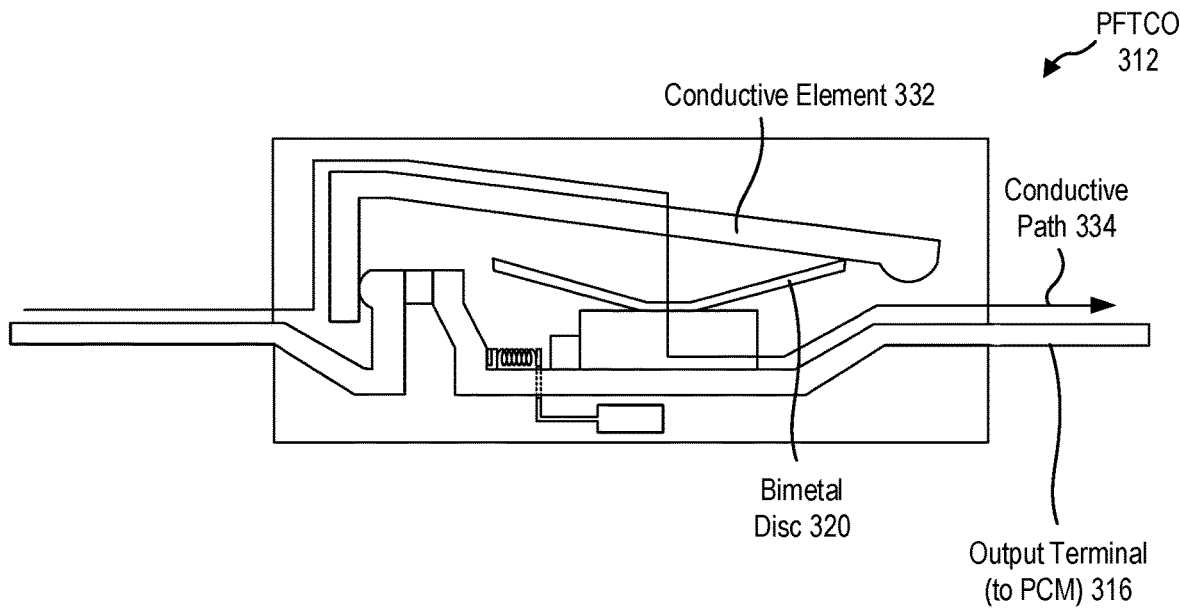
Figure 3:
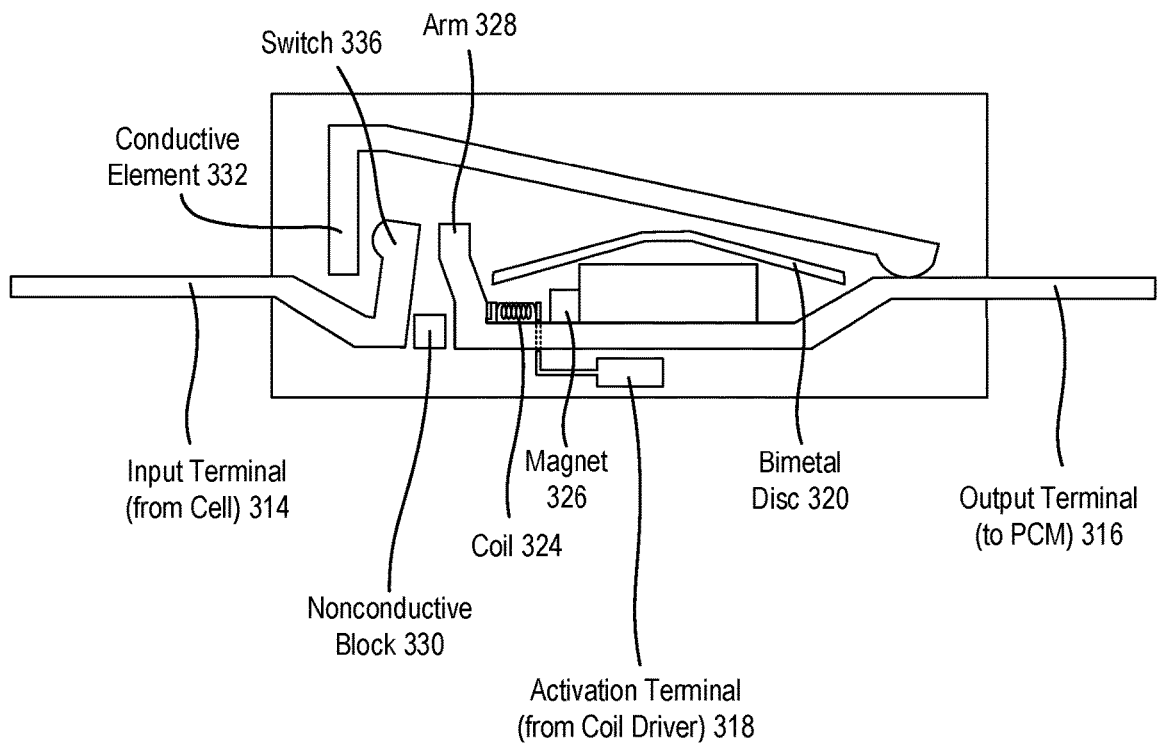

FIG. 3-1 through FIG. 3-3 illustrate an embodiment of a PFTCO 312 according to the present disclosure that may be used in a circuit (such as battery circuit 200 described in relation to FIG. 2). In some embodiments, the PFTCO 312 has a first terminal (e.g., input terminal 314) and a second terminal (e.g., output terminal 316) that are in electrical communication with one another and allow current from the from the first terminal to the second terminal through the PFTCO 312. The PFTCO 312 further includes a third terminal (e.g., activation terminal 318) that is in data communication with an external device, such as a BMS (e.g., BMS 208 of FIG. 2).

In some embodiments, a temporary failure mechanism includes a bimetal disc 320 and a positive temperature coefficient (PTC) element 322. In some embodiments, the PF mechanism includes a coil 324 and a magnet 326 that allow movement of an arm 328 relative to a nonconductive block 330. When the nonconductive block 330 is in contact with the arm 328, the arm 328 can apply a force to the nonconductive block 330 to hold the nonconductive block 330 in position and keep the PF mechanism in a closed state.

In some embodiments, when the PF mechanism and the temporary failure mechanism are in a closed state (e.g., inactive state), the current can flow from the first terminal, through a conductive element 332, and out the second terminal along a conductive path 334.

FIG. 3-2 illustrates an embodiment of activation of the temporary failure mechanism. The bimetal disc 320 deforms and changes shape due to exposure to an elevated temperature and/or current. In some embodiments, a portion of the bimetal disc 320 bends toward the conductive element 332, deflecting the conductive element 332 out of contact with the output terminal 316. In some embodiments, disconnecting the conductive element 332 from the second terminal opens the circuit. In some embodiments, disconnecting the conductive element 332 from the second terminal with the bimetal disc 320 changes the conductive path 334 through the PFTCO 312. In some embodiments, the conductive path 334 through the bimetal disc 320 allows less current through the PFTCO 312, which can reduce temperatures and/or risk of damage to the PFTCO 312, the battery cells, the battery as a whole, or the electronic device to which the battery is connected. As the bimetal disc 320 cools, the bimetal disc 320 may restore to its original, inactive shape (as shown in FIG. 3-1) and the conductive element 332 can reconnect with the second terminal directly.

FIG. 3-3 illustrates the PFTCO 312 of FIG. 3-1 and FIG. 3-3 after the PF mechanism is activated through the third terminal (e.g., activation terminal 318). The activation terminal 318 is in electrical communication with the coil 324. The coil 324 and/or magnet 326 applies an attractive force to the arm 328 to move the arm 328 relative to the nonconductive block 330. In some embodiments, the nonconductive block 330 falls from the inactive position. The nonconductive block 330 in the inactive position applies a force to elastically deform a switch 336 and hold the switch 336 in contact with the conductive element 332. Removing the nonconductive block 330 allows the switch 336 of the PF mechanism to elastically restore to a non-deformed state, such as shown in FIG. 3-3 and disconnect from the conductive element 332. Disconnecting the switch 336 of the PF mechanism from the conductive element 332 opens the circuit between the input terminal 314 and the output terminal 316. Disconnecting the switch 336 of the PF mechanism from the conductive element 332 results in a PF of the PFTCO 312 because the nonconductive block 330 cannot be returned to the inactive position without disassembly of the PFTCO 312 or the circuit.

In some embodiments, the nonconductive block is meltable by exposure to an elevated temperature, which may be an environmental temperature (e.g., convective melting) or a temperature of the switch with which the nonconductive block is in contact (e.g., conductive melting). In some embodiments, the nonconductive block is melted by heat applied through a heating coil or other heating element upon receiving a command from an external source through the third terminal of the PFTCO. In some embodiments, a force is applied to the nonconductive block directly to push or pull the nonconductive block out of position in the PF mechanism and open the circuit.

Figure 4:
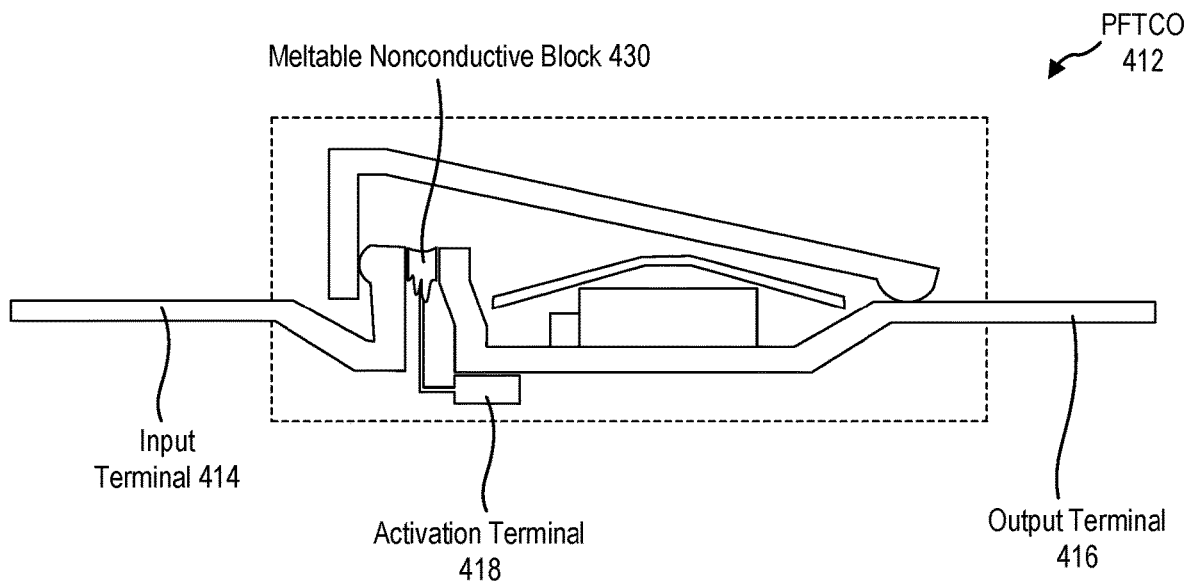
FIG. 4 is a schematic representation of a PFTCO with a meltable block in a permanent failure mechanism, according to at least one embodiment of the present disclosure.

FIG. 4 illustrates an embodiment of a PFTCO 412 (similar to the PFTCO 312 described in relation to FIG. 3-1 through 3-3) with a meltable nonconductive block 430 (similar to the nonconductive block 330 described in relation to FIG. 3-1 through 3-3). In some embodiments, the meltable nonconductive block 430 melts in response to a current applied through the activation terminal 418. The meltable nonconductive block 430 may melt above 100° C., 120° C., 140° C., 150° C., 160° C., 180° C., 200° C., 225° C., 250° C., 300° C., or any values therebetween. For example, higher current applications for the PFTCO 412 may employ a meltable nonconductive block 430 with a higher melting temperature. In some examples, a lower melting temperature may provide earlier intervention to PF the circuit or part of the circuit.

In some embodiments, the removable block is a conductive block through which current flows between the first terminal and the second terminal of the PFTCO. Removal of the conductive block irreversibly opens the circuit. The conductive block can be removable by a variety of methods. In some embodiments, the conductive block is removable by removing a compressive force holding the removable block in place, causing the conductive block to fall or otherwise move from the contacts, opening the circuit.

In some embodiments, the conductive block is meltable by exposure to an elevated temperature, which may be an environmental temperature (e.g., convective melting) or a temperature of the switch with which the conductive block is in contact (e.g., conductive melting). In some embodiments, the conductive block is melted by heat applied through a heating coil or other heating element upon receiving a command from an external source through the third terminal of the PFTCO. In some embodiments, the meltable conductive block melts above 100° C., 120° C., 140° C., 150° C., 160° C., 180° C., 200° C., 225° C., 250° C., 300° C., or any values therebetween. In some embodiments, a force is applied to the conductive block directly to push or pull the conductive block out of position in the PF mechanism and open the circuit.

Figure 5:
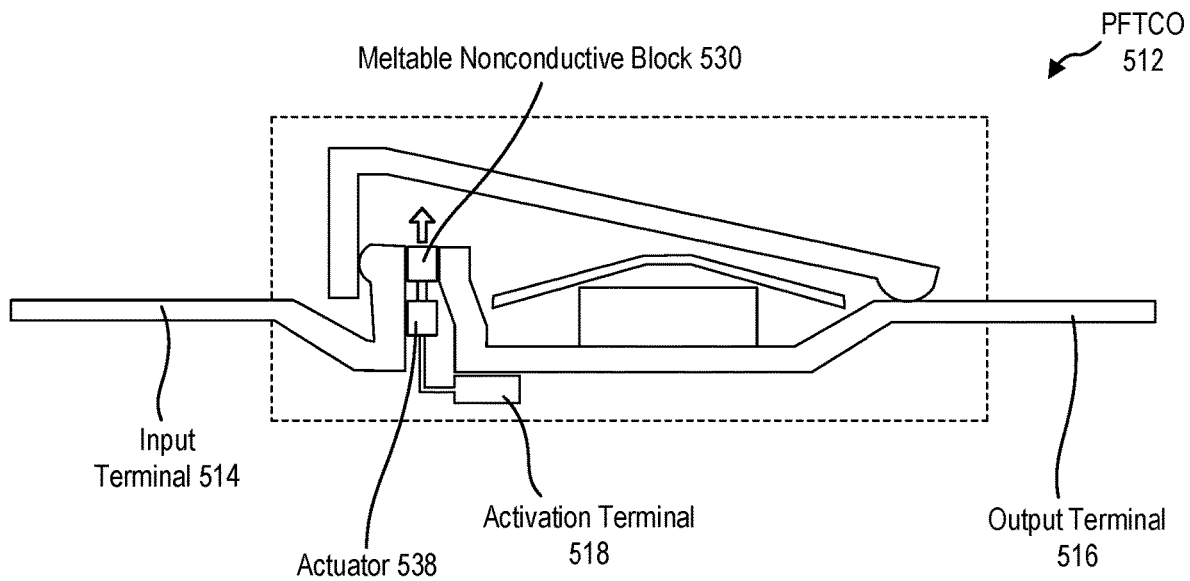
FIG. 5 is a schematic representation of a PFTCO with a movable block in a permanent failure mechanism, according to at least one embodiment of the present disclosure.

FIG. 5 illustrates another embodiment of a PFTCO 512 according to the present disclosure. In some embodiments, the activation terminal 518 of the PFTCO 512 is in communication with an actuator 538 that applies a mechanical force directly to the nonconductive block 530 (or a conductive block) to move the nonconductive block 530 from the PF mechanism. After the nonconductive block 530 is removed, the switch 536 may open and the conductive path between the input terminal 514 and the output terminal 516 may open.

In some embodiments, the PFTCO includes an inline fuse in the PFTCO. The inline fuse can be passively activated (e.g., melting and opening the circuit) based on current through the fuse. In some embodiments, the inline fuse is a three-terminal fuse in the PFTCO that is activated through the third terminal of the PFTCO. In some embodiments, the inline fuse is replaceable to repair the PFTCO and allow further use. For example, the PFTCO can include a blade fuse or other replaceable fuse. In some embodiments, the fuse is internal to and/or integrated into the PFTCO such that repair of the PFTCO requires disassembly of the PFTCO.

Figure 6:
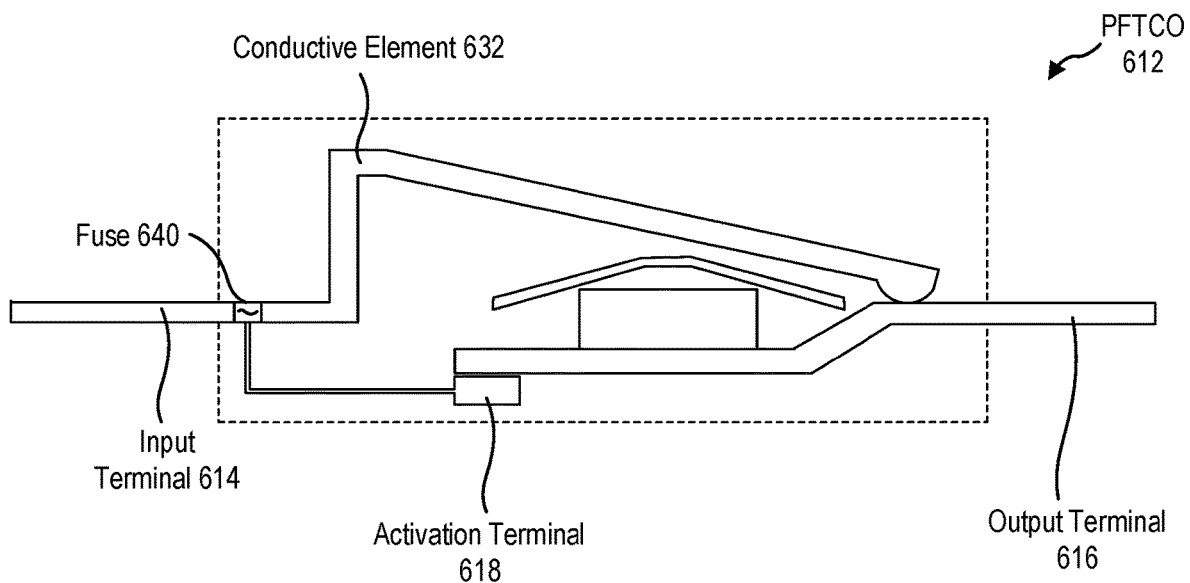
FIG. 6 is a schematic representation of a PFTCO with a three-terminal fuse in a permanent failure mechanism, according to at least one embodiment of the present disclosure.

FIG. 6 illustrates another embodiment of a PFTCO 612 according to the present disclosure. In some embodiments, the activation terminal 618 of the PFTCO 612 is in communication with a fuse 640 located in the PFTCO 612. In some embodiments, the fuse 640 is a three-terminal fuse. In some embodiments, the activation terminal 618 is in data communication and receives commands from a BMS (such as BMS 208 described in relation to FIG. 2). The activation terminal 618 can send an electrical signal to the fuse 640 to melt the fuse 640. In some embodiments, the fuse 640 is configured to melt in response to an overcurrent or over-temperature condition in the conductive path between the input terminal 614 and the output terminal 616. In some embodiments, the fuse 640 is configured to melt in response to an overcurrent or over-temperature condition in the conductive path between the input terminal 614 and the output terminal 616 and is a three-terminal fuse that can melt in response to an electrical signal from the activation terminal 618. After the fuse 640 melts, the conductive path between the input terminal 614 and the output terminal 616 may open.

A PFTCO according to the present disclosure includes a temporary failure mechanism. In some embodiments, a PF mechanism causes a PF of the temporary failure mechanism. For example, the PF mechanism can cause a PF of the bimetal disc. In some embodiments, the PF mechanism can inhibit and/or prevent the reset of the temporary failure mechanism, allowing a user or the PFTCO to selectively change the temporary failure mechanism to a PF mechanism.

In some embodiments, the PF mechanism catches the temporary failure mechanism and locks the temporary failure mechanism in the active or open state when the circuit is open. For example, the temporary failure mechanism can activate, limiting and/or prevent current flow through the PFTCO, and the PF mechanism can render the temporary failure mechanism unable to reset. In some embodiments, the PF mechanism plastically deforms the temporary failure mechanism into the active or open state. In some embodiments, the PF mechanism elastically deforms the temporary failure mechanism, urging the temporary failure mechanism into the active or open state and subsequently locks the temporary failure mechanism in the active or open state.

Figures 1, 7:
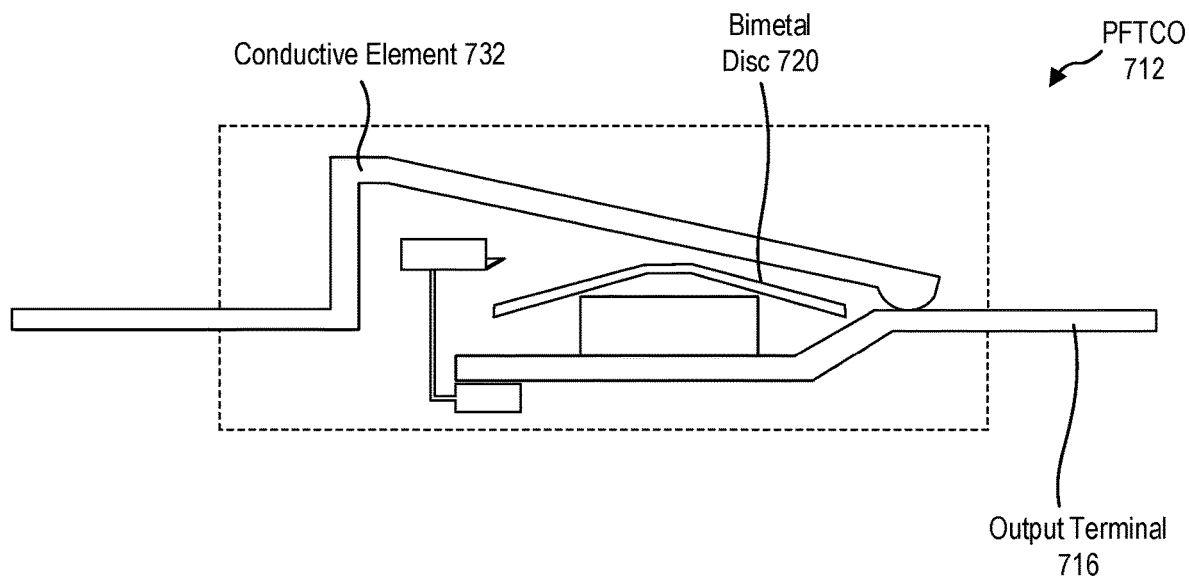
Figures 2, 7:
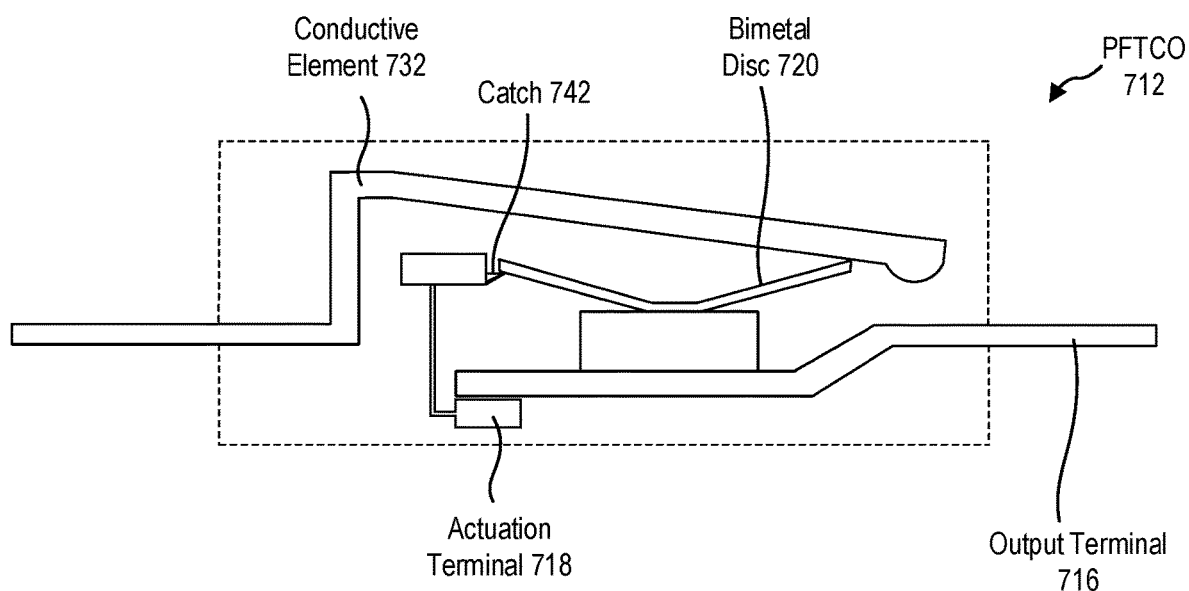

FIGS. 7-1 and 7-2 illustrate an embodiment of a PFTCO 712 having a PF mechanism integrated into the temporary failure mechanism. In some embodiments, the temporary failure mechanism of the PFTCO 712 includes a bimetal disc 720 (e.g., bimetal disc 320 described in relation to FIG. 3-1 through 3-3). The bimetal disc 720 changes shape to contact the conductive element 732 and move the conductive element 732 away from the output terminal 716, as shown in FIG. 7-2. In some embodiments, the bimetal disc 720 can return to the original state shown in FIG. 7-1 and reset the temporary failure mechanism. In some embodiments, a PF mechanism of the PFTCO 712 includes a catch 742 that is selectively deployable to engage with the bimetal disc 720 or other temporary failure mechanism. In some embodiments, the catch 742 is in communication with the activation terminal 718 to allow remote activation of the catch 742.

In some embodiments, the catch 742 engages with the temporary failure mechanism when the temporary failure mechanism is an active state. After the bimetal disc 720 moves and contacts the conductive element 732, opening the circuit, the catch 742 may engage with the bimetal disc 720 preventing the temporary failure mechanism from resetting to an inactive state. The catch 742 or other PF mechanism thereby holds the temporary failure mechanism in the active state permanently, resulting in a PF of the PFTCO 712.

A PFTCO according to the present disclosure can allow the selective or reactive PF of one or more battery cells in a battery without requiring the PF of the entire battery. In some embodiments, a first battery cell is in parallel with a second battery cell. A first PFTCO is in series with the first battery cell, and a second PFTCO is in series with the second battery cell. The first PFTCO and second PFTCO are in parallel with one another. In some embodiments, if an undesired condition is detected in the first battery cell, the first PFTCO can open the circuit in line with the first battery cell, stopping any current flow through or from the first battery cell. The second battery cell can remain functional.

In some embodiments, if an undesirable condition is detected for the battery as a whole, both the first PFTCO and the second PFTCO can have PF mechanisms activated and result in a PF of the entire battery. The ability to retain functionality of a portion of the battery while producing a PF of certain battery cells may be desirable in some situations. For example, large batteries, such as electric car batteries, may include thousands of battery cells. An impact to the battery may damage some of the battery cells and requiring a PF of those cells for the safety of the vehicle and the passengers, while the remainder of the battery can continue to function and allow the vehicle to move to a safer location.

Figure 8:
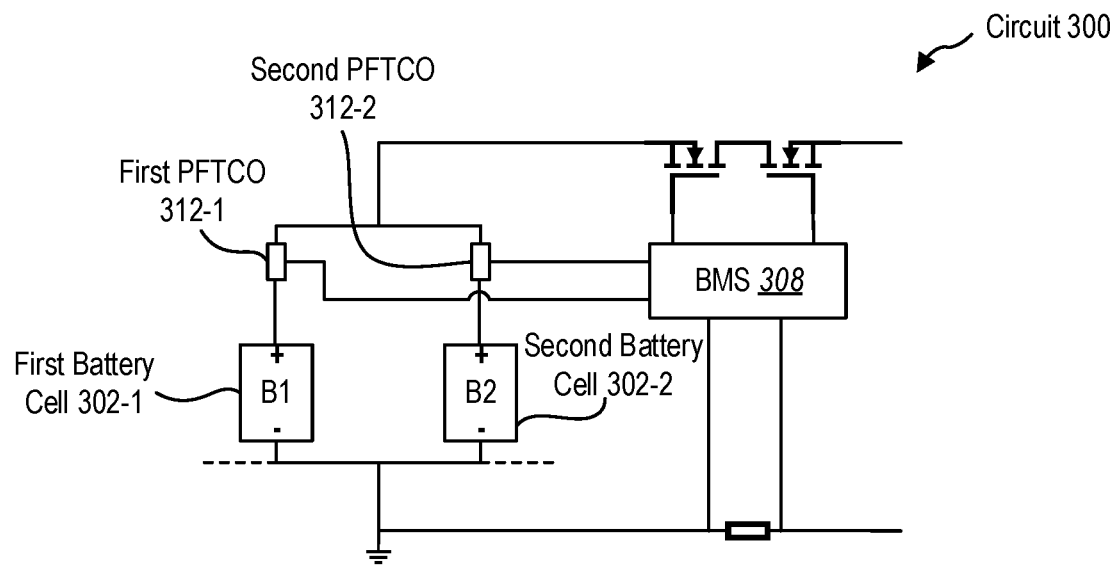
FIG. 8 is a circuit diagram of a battery circuit including permanent failure thermal cutoff (PFTCO) devices in series with parallel battery cells, according to at least one embodiment of the present disclosure.

FIG. 8 is a circuit diagram of an embodiment of a battery circuit 300 according to the present disclosure. The circuit 300 includes a first battery cell 302-1 in parallel with a second battery cell 302-2. In some embodiments, each of the first battery cell 302-1 and second battery cell 302-2 have a PFTCO in series, respectively. For example, the first battery cell 302-1 has a first PFTCO 312-1 (such as the PFTCO 312 described in relation to FIG. 3-1 through 3-3) in direct series, and the second battery cell 302-2 has a second PFTCO 312-2 in direct series, such that the first PFTCO 312-1 and second PFTCO 312-2 are in parallel with one another.

In some embodiments, the first PFTCO 312-1 and second PFTCO 312-2 are both in data communication with a BMS 308. The BMS 308 can send commands to the first PFTCO 312-1 and second PFTCO 312-2 through the third terminal (e.g., the activation terminal 318 described in relation to FIG. 3-1 through 3-3). In some embodiments, the BMS 308 sends commands to activate the PF mechanism of the first PFTCO 312-1, which results in a PF of the portion of the circuit 300 including the first battery cell 302-1 only. In some embodiments, the BMS 308 sends commands to activate the PF mechanism of the second PFTCO 312-2, which results in a PF of the portion of the circuit 300 including the second battery cell 302-2 only. In some embodiments, the BMS 308 sends commands to activate the PF mechanism of the first PFTCO 312-1 and the second PFTCO 312-2, which results in a PF of both the first battery cell 302-1 and second battery cell 302-2. In embodiments having N battery cells, the BMS 308 can activate the PF mechanism of any number of the PFTCOs (including all of the PFTCOs) to produce a PF of any number of the battery cells (including all of the battery cells).

Figure 9:
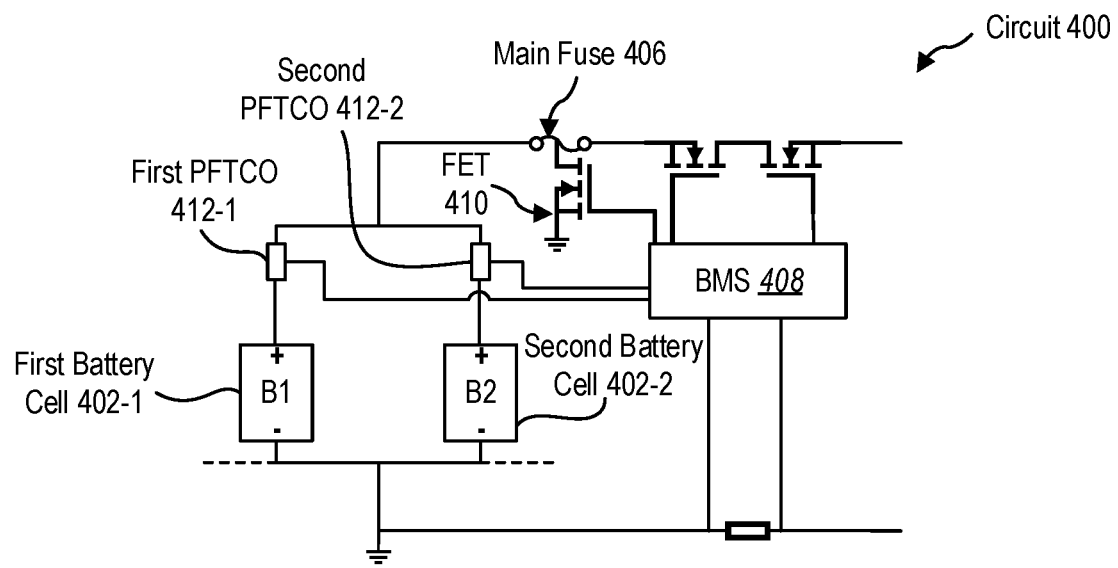
FIG. 9 is a circuit diagram of a battery circuit including permanent failure thermal cutoff (PFTCO) devices in series with parallel battery cells with a main fuse in series with the parallel battery cells, according to at least one embodiment of the present disclosure.

In some embodiments, a circuit can include battery cells and PFTCOs in parallel with a main fuse of the circuit located in series with the battery cells and PFTCOs to allow the option to PF the entire circuit, if needed. FIG. 9 is a circuit diagram illustrating an embodiment of a circuit 400 according to the present disclosure. The circuit 400 includes a first battery cell 402-1 in parallel with a second battery cell 402-2. In some embodiments, each of the first battery cell 402-1 and second battery cell 402-2 have a PFTCO in series, respectively. For example, the first battery cell 402-1 has a first PFTCO 412-1 (such as the PFTCO 412 described in relation to FIG. 4) in direct series, and the second battery cell 402-2 has a second PFTCO 412-2 in direct series, such that the first PFTCO 412-1 and second PFTCO 412-2 are in parallel with one another.

In some embodiments, the PFTCOs 412-1, 412-2 are controllable by the BMS 408. In some embodiments, the BMS 408 or other device is in electrical communication with a main fuse 406 of the circuit 400. While individual control of the PFTCOs 412-1, 412-2 can PF individual portions of the circuit 400, a main fuse 406 can allow the entire circuit 400 to be opened with a PF. For example, the BMS 408 may send an electrical signal to the FET 410 to melt the three-terminal main fuse 406 and open the circuit 400.

INDUSTRIAL APPLICABILITY

The present disclosure relates generally to systems and methods for safely supplying electricity to an electronic device. More particularly, the present disclosure relates to controlling electricity from one or more battery cells in a battery to ensure the battery safely receives electricity (e.g., during charging) and provides electricity (e.g., while powering the electronic device) over its operational lifetime.

Battery cells can be arranged in parallel and/or serial circuits to provide electricity for a variety of applications. Because batteries, such as lithium ion batteries, nickel-cadmium batteries, lead-acid batteries, and others, store energy in the form of chemical potential energies, the batteries are potentially hazardous if the release of that potential energy as electricity is not well-regulated.

In some embodiments, a battery includes one or more battery cells in series or parallel to provide electricity through a circuit. In some embodiments, the circuit includes two types of safety precautions that can limit and/or stop the flow of current through the circuit or a portion of the circuit. For example, the circuit can include temporary failure safety mechanisms and permanent failure (PF) safety mechanisms. A temporary failure safety mechanism is a reversible mechanism that opens the circuit or limits current flow through the circuit when in an activated state due to a triggering condition. A PF safety mechanism is an irreversible mechanism that opens the circuit and stops current flow when in an activated state due to a triggering condition.

A triggering condition is any unsafe or undesired condition that results directly or indirectly in the activation of a safety mechanism. In some embodiments, the triggering condition is an environmental condition, such as temperature of the circuit. In some embodiments, the triggering condition is a measured condition, such as an overvoltage condition or overcurrent condition. In some embodiments, the triggering condition can be an electronic command provided by a user.

A temporary failure safety mechanism can be reset to an inactive state without disassembly of the battery or circuit and/or without replacement of any part of the battery or circuit. In some embodiments, a temporary failure safety mechanism allows for a mechanical or electrical reset of the temporary failure safety mechanism. In some embodiments, a mechanical reset includes a physical switch that is manually moved by a user to reset the temporary failure mechanism. In some embodiments, a mechanical reset includes a biasing element, such as a spring or a weight, that urges the temporary failure safety mechanism toward the inactive state. The temporary failure safety mechanism can thereby return to an inactive state once the triggering condition passes, without user interaction. In some embodiments, an electrical reset is a device or connection that allows the temporary failure safety mechanism to move back to an inactive state through the application of a electrical voltage or current. In some embodiments, an electrical reset is an electric motor, an electromagnet, a linear actuator, or other electrical device that applies a force to reset the temporary failure safety mechanism via a command sent to the electrical reset.

A PF safety mechanism cannot be reset to an inactive state without disassembly of the battery and/or circuit or without replacement of at least one component. A fuse is an example of a PF safety mechanism. In some embodiments, a PF safety mechanism is a passive PF safety mechanism that activates in the presence of a triggering condition without user intervention. In some embodiments, a PF safety mechanism is an active PF safety mechanism that is activated by a user or by an electrical command based on a sensed condition.

In some embodiments, the temporary failure safety mechanism and PF safety mechanism are integrated in a single component. In some embodiments, a TCO includes a PF safety mechanism. A permanent failure thermal cutoff (PFTCO) according to the present disclosure can include a passive PF safety mechanism and/or an active PF safety mechanism in addition to a temporary failure mechanism.

By including the PF safety mechanism in a PFTCO, a circuit-level fuse can be removed from a battery circuit. Removal of the circuit-level fuse in series with the battery cells can reduce the total impedance of the circuit and improve efficiency of the system. In some embodiments, a circuit with battery cells and PFTCOs including a PF safety mechanism according to the present disclosure can allow the PF of individual battery cells or banks of battery cells without requiring the PF of the entire circuit and/or battery.

In some embodiments, the passive PF safety mechanism of a PFTCO is configured to activate without express input from a user or from a controller. In some embodiments, the passive PF safety mechanism will activate and cause a PF of the PFTCO when the passive PF safety mechanism exceeds a threshold temperature. In some embodiments, the passive PF safety mechanism will activate and cause a PF of the PFTCO when the passive PF safety mechanism exceeds a threshold current. In some embodiments, the passive PF safety mechanism will activate and cause a PF of the PFTCO when the passive PF safety mechanism exceeds a threshold voltage.

In some embodiments, the active PF safety mechanism of a PFTCO is configured to activate upon receiving a command or electrical signal from a user or controller. In some embodiments, the active PF safety mechanism will activate and cause a PF of the PFTCO when the active PF safety mechanism receives a command from a BMS. In some embodiments, the active PF safety mechanism will activate and cause a PF of the PFTCO when the active PF safety mechanism receives a command from a thermocouple or thermistor located outside of the PFTCO. In some embodiments, the active PF safety mechanism will activate and cause a PF of the PFTCO when the active PF safety mechanism receives a command from a processor of an electronic device to which the battery is connected.

In some embodiments, a PFTCO includes a temporary failure mechanism and a PF mechanism. The PF mechanism may be a PF connector that provides electrical communication when in the closed or inactive state and opens the circuit when in an open or active state. The PF connector may be before or after the temporary failure mechanism in the PFTCO. In some embodiments, the PF connector is held the closed or inactive state by a nonconductive block. The nonconductive block holds a switch of the PF connector in contact with another conductive element of the PFTCO, providing an electrical path between a first terminal of the PFTCO and a second terminal of the PFTCO.

In some embodiments, the PFTCO includes a third terminal that is in data communication with a controller, such as a BMS. The BMS can communicate with the PF mechanism through the third terminal to selectively cause a PF of the PFTCO. The temporary failure mechanism may be in communication with the BMS, also, or the temporary failure mechanism is a passive mechanism. In some embodiments, the communication between the PFTCOs and the BMS is one-way, for example, the BMS utilizes a communication line to trigger a PF. In some embodiments, the communication between the PFTCOs and the BMS is two-way, for example, the PFTCOs notify the BMS when a temporary failure has occurred and the BMS instructs the PFTCOs to trigger a PF.

In some embodiments, the temporary failure mechanism includes a bimetal disc that includes two different metals with different coefficients of thermal expansion (CTE). The different CTE of the two metals causes the bimetal disc to flex or otherwise change shape depending on a temperature of the bimetal disc. In some embodiments, the temperature of the bimetal disc is based on environmental temperature in and around the PFTCO. In some embodiments, the temperature of the bimetal disc is affected by a current flowing through the bimetal disc. For example, a portion of the current flowing between the first terminal and the second terminal may be directed through the bimetal disc of the temporary failure mechanism. The resistance of the bimetal disc may result in heating and activation of the temporary failure mechanism.

In some embodiments, the PF mechanism includes a removable block that, when removed, activates the PF mechanism and irreversibly opens the circuit. In some embodiments, the removable block is a nonconductive block that compresses a switch of the PF mechanism against a conductive member to close the circuit. The nonconductive block can be removable by a variety of methods. In some embodiments, the nonconductive block is removable by removing a compressive force holding the removable block in place, causing the nonconductive block to fall or otherwise move from the switch, allowing the switch to move and open the circuit.

In some embodiments, the nonconductive block is meltable by exposure to an elevated temperature, which may be an environmental temperature (e.g., convective melting) or a temperature of the switch with which the nonconductive block is in contact (e.g., conductive melting). In some embodiments, the nonconductive block is melted by heat applied through a heating coil or other heating element upon receiving a command from an external source through the third terminal of the PFTCO. In some embodiments, a force is applied to the nonconductive block directly to push or pull the nonconductive block out of position in the PF mechanism and open the circuit.

In some embodiments, the removable block is a conductive block through which current flows between the first terminal and the second terminal of the PFTCO. Removal of the conductive block irreversibly opens the circuit. The conductive block can be removable by a variety of methods. In some embodiments, the conductive block is removable by removing a compressive force holding the removable block in place, causing the conductive block to fall or otherwise move from the contacts, opening the circuit.

In some embodiments, the conductive block is meltable by exposure to an elevated temperature, which may be an environmental temperature (e.g., convective melting) or a temperature of the switch with which the conductive block is in contact (e.g., conductive melting). In some embodiments, the conductive block is melted by heat applied through a heating coil or other heating element upon receiving a command from an external source through the third terminal of the PFTCO. In some embodiments, a force is applied to the conductive block directly to push or pull the conductive block out of position in the PF mechanism and open the circuit.

In some embodiments, the PFTCO includes an inline fuse in the PFTCO. The inline fuse can be passively activated (e.g., melting and opening the circuit) based on current through the fuse. In some embodiments, the inline fuse is a three-terminal fuse in the PFTCO that is activated through the third terminal of the PFTCO. In some embodiments, the inline fuse is replaceable to repair the PFTCO and allow further use. For example, the PFTCO can include a blade fuse or other replaceable fuse. In some embodiments, the fuse is internal to and/or integrated into the PFTCO such that repair of the PFTCO requires disassembly of the PFTCO.

A PFTCO according to the present disclosure includes a temporary failure mechanism. In some embodiments, a PF mechanism causes a PF of the temporary failure mechanism. For example, the PF mechanism can cause a PF of the bimetal disc. In some embodiments, the PF mechanism can inhibit and/or prevent the reset of the temporary failure mechanism, allowing a user or the PFTCO to selectively change the temporary failure mechanism to a PF mechanism.

In some embodiments, the PF mechanism catches the temporary failure mechanism and locks the temporary failure mechanism in the active or open state when the circuit is open. For example, the temporary failure mechanism can activate, limiting and/or prevent current flow through the PFTCO, and the PF mechanism can render the temporary failure mechanism unable to reset. In some embodiments, the PF mechanism plastically deforms the temporary failure mechanism into the active or open state. In some embodiments, the PF mechanism elastically deforms the temporary failure mechanism, urging the temporary failure mechanism into the active or open state and subsequently locks the temporary failure mechanism in the active or open state.

A PFTCO according to the present disclosure can allow the selective or reactive PF of one or more battery cells in a battery without requiring the PF of the entire battery. In some embodiments, a first battery cell is in parallel with a second battery cell. A first PFTCO is in series with the first battery cell, and a second PFTCO is in series with the second battery cell. The first PFTCO and second PFTCO are in parallel with one another. In some embodiments, if an undesired condition is detected in the first battery cell, the first PFTCO can open the circuit in line with the first battery cell, stopping any current flow through or from the first battery cell. The second battery cell can remain functional.

In some embodiments, if an undesirable condition is detected for the battery as a whole, both the first PFTCO and the second PFTCO can have PF mechanisms activated and result in a PF of the entire battery. The ability to retain functionality of a portion of the battery while producing a PF of certain battery cells may be desirable in some situations. For example, large batteries, such as electric car batteries, may include thousands of battery cells. An impact to the battery may damage some of the battery cells and requiring a PF of those cells for the safety of the vehicle and the passengers, while the remainder of the battery can continue to function and allow the vehicle to move to a safer location.

In some embodiments, a circuit can include battery cells and PFTCOs in parallel with a main fuse of the circuit located in series with the battery cells and PFTCOs to allow the option to PF the entire circuit, if needed.

The present disclosure relates to systems and methods for systems and methods for safely supplying electricity to an electronic device according to at least the examples provided in the sections below:

1. A device for controlling battery operation, the device comprising:
    a battery cell (e.g., battery cell 202-1, 202-2, FIG. 2);
    a permanent failure thermal cutoff (e.g., PFTCO 212-1, 212-2, FIG. 2; 312, FIG. 3-1 through 3-3; 412, FIG. 4; 512, FIG. 5; 612, FIG. 6; 712, FIG. 7-1, 7-2) electrically-coupled in series between the battery cell and a system load of the device, the thermal cutoff having at least three terminals where a first terminal (e.g., input terminal 314, FIG. 3-1) of the thermal cutoff is connected to the battery cell and a second terminal of the thermal cutoff is electrically-coupled to the system load, where the thermal cutoff includes:
        a permanent failure mechanism (e.g., arm 328, nonconductive block 330, and switch 336, FIG. 3-1 through 3-3; meltable nonconductive block 430, FIG. 4; nonconductive block 530 and actuator 538, FIG. 5; fuse 640, FIG. 6; catch 742, FIG. 7) having an open state and closed state where the closed state allows electrical communication between the first terminal (e.g., input terminal 314, FIG. 3-1) and a second terminal (e.g., output terminal 316, FIG. 3-1); and
    a battery management system (e.g., BMS 208, FIG. 2) and a second terminal of the thermal cutoff is electrically-coupled to the system load to a third terminal (e.g., activation terminal 318, FIG. 3-1 through 3-3) of the thermal cutoff, wherein in response to an electrical signal from the battery management system, the permanent failure mechanism permanently switches to the open state.
2. The device of section 1, wherein the permanent failure mechanism (e.g., coil 324, FIG. 3-3) is in electrical communication with the third terminal (e.g., activation terminal 318, FIG. 3-3).
3. The device of sections 1 or 2, wherein the permanent failure mechanism includes a movable component (e.g., nonconductive block 330, FIG. 3-1 through FIG. 3-3) to hold the permanent failure mechanism in the closed position, wherein movement of the movable component changes the permanent failure mechanism to the open state and causes permanent failure of the thermal cutoff.
4. The device of section 3, wherein the movable component is a meltable (e.g., meltable nonconductive block 430, FIG. 4) by an elevated temperature.
5. The device of any of sections 1-4 further comprising an electromagnet (e.g., magnet 326, FIG. 3-3) configured to transition the permanent failure mechanism to the open state.
6. The device of any of sections 1-5 further comprising a mechanical actuator (e.g., actuator 538, FIG. 5) to move the permanent failure mechanism to the open state.
7. The device of section 6, wherein the permanent failure mechanism includes a removable block (e.g., nonconductive block 530, FIG. 5) to hold the permanent failure mechanism in the closed position and the mechanical actuator moves the removable block.
8. The device of any of sections 1-7, wherein the thermal cutoff includes a reversible switch (bimetal disc 320, FIG. 3-1 through FIG. 3-3) having a first state and a second state, where the second state reduces the electrical communication between the first terminal and a second terminal relative to the first state (e.g., conductive path 334, FIG. 3-1; conductive path 334, FIG. 3-2).
9. The device of section 8, wherein the permanent failure mechanism (e.g., catch 742, FIG. 7-2) contacts the reversible switch (e.g., bimetal disc 720, FIG. 7-2) so as to cause a permanent failure of the reversible switch.
10. A method for controlling electricity supply in a battery, the method comprising:
    providing an electrical current through a circuit in a thermal cutoff device of the battery;
    detecting an undesired condition of the battery;
    in response to the undesired condition of the battery, activating a permanent failure mechanism of the thermal cutoff device so as to open the circuit.
11. The method of section 10, wherein the undesired condition is a temperature exceeding a threshold temperature.
12. The method of section 11, wherein the temperature is a temperature of the thermal cutoff device.
13. The method of any of sections 10-12, wherein the undesired condition is an overvoltage condition of a battery cell in electrical series with the thermal cutoff device.
14. The method of any of sections 10-13, wherein the undesired condition is an overvoltage condition of the battery.
15. The method of any of sections 10-14, wherein the undesired condition is an overcurrent condition of the battery.
16. The method of any of sections 10-15, wherein activating the permanent failure mechanism includes heating the permanent failure mechanism.
17. The method of any of sections 10-16, wherein activating the permanent failure mechanism includes receiving a failure command at a third terminal of the thermal cutoff device.
18. The method of section 17, wherein the failure command is received from a battery management system.
19. A battery for supplying electricity to an electronic device, the battery comprising:
    a first battery cell (e.g., first battery cell 302-1, FIG. 8);
    a second battery cell (e.g., second battery cell 302-2, FIG. 8) in parallel with the first battery cell;
    a first thermal cutoff (e.g., first PFTCO 312-1, FIG. 8) in serial electrical communication with the first battery cell, the first thermal cutoff having at least three terminals where a first terminal (e.g., input terminal 314, FIG. 3-1) of the first thermal cutoff is connected to the first battery cell, where the first thermal cutoff includes:
   a first permanent failure mechanism having an open state and closed state where the closed state allows electrical communication between the first terminal and a second terminal; and
a second thermal cutoff (e.g., second PFTCO 312-2, FIG. 8) in serial electrical communication with the second battery cell and in parallel with the first thermal cutoff, the second thermal cutoff having at least three terminals where a first terminal (e.g., input terminal 314, FIG. 3-1) of the second thermal cutoff is connected to the second battery cell, where the second thermal cutoff includes:
   a second permanent failure mechanism having an open state and closed state where the closed state allows electrical communication between the first terminal and a second terminal.
20. The battery of section 19, wherein the battery does not include a main fuse in series with the first battery cell and second battery cell.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for controlling battery operation, the device comprising:
   a battery cell;
   a thermal cutoff coupled in series between the battery cell and a system load of the device, the thermal cutoff having at least three terminals wherein a first terminal of the thermal cutoff is electrically-coupled to the battery cell and a second terminal of the thermal cutoff is electrically-coupled to the system load, and wherein the thermal cutoff includes:
      a permanent failure mechanism having a moveable component and a switch separated by a removable nonconductive block and having an open state and closed state wherein the closed state allows electrical communication between the first terminal and the second terminal; and
   a battery management system electrically-coupled to a third terminal of the thermal cutoff, the first terminal and the third terminal are electrically coupled via the second terminal, wherein in response to an electrical signal from the battery management system, the permanent failure mechanism permanently switches to the open state.

2. The device of claim 1, wherein the permanent failure mechanism is in electrical communication with the third terminal.

3. The device of claim 1, wherein the moveable component is positioned in a first position to hold the removable nonconductive block such that the permanent failure mechanism is in the closed position, wherein movement of the moveable component to a second position moves the removable nonconductive block to changes the permanent failure mechanism to the open state and causes permanent failure of the thermal cutoff.

4. The device of claim 3, wherein the removable nonconductive block is meltable by an elevated temperature.

5. The device of claim 1 further comprising an electromagnet configured to transition the permanent failure mechanism to the open state.

6. The device of claim 1 further comprising a mechanical actuator configured to transition the permanent failure mechanism to the open state.

7. The device of claim 6, wherein the mechanical actuator moves the removable nonconductive block.

8. The device of claim 1, wherein the thermal cutoff includes a reversible switch having a first state and a second state, where the second state reduces the electrical communication between the first terminal and a second terminal relative to the first state.

9. The device of claim 8, wherein the permanent failure mechanism contacts the reversible switch so as to cause a permanent failure of the reversible switch.

10. A method for controlling electricity supply in a battery, the method comprising:

providing the device for controlling battery operation of claim 1;

providing an electrical current through the thermal cutoff;

detecting an undesired condition of the battery;

in response to the undesired condition of the battery, activating the permanent failure mechanism of the thermal cutoff so as to open the circuit.

11. The method of claim 10, wherein the undesired condition is a temperature exceeding a threshold temperature.

12. The method of claim 11, wherein the temperature is a temperature of the thermal cutoff.

13. The method of claim 10, wherein the undesired condition is an overvoltage condition of a battery cell in electrical series with the thermal cutoff.

14. The method of claim 10, wherein the undesired condition is an overvoltage condition of the battery.

15. The method of claim 10, wherein the undesired condition is an overcurrent condition of the battery.

16. The method of claim 10, wherein activating the permanent failure mechanism includes heating the permanent failure mechanism.

17. The method of claim 10, wherein activating the permanent failure mechanism includes receiving a failure command at a third terminal of the thermal cutoff.

18. The method of claim 17, wherein the failure command is received from a battery management system.

19. The device of claim 1, wherein the permanent failure mechanism includes a removable block to hold the permanent failure mechanism in the closed position.

20. A battery for supplying electricity to an electronic device, the battery comprising:

a first battery cell;

a second battery cell in parallel with the first battery cell;

a first thermal cutoff in serial electrical communication with the first battery cell, the first thermal cutoff having at least three terminals where a first terminal of the first thermal cutoff is connected to the first battery cell and a second terminal of the first thermal cutoff is electrically-coupled to the system load, where the first thermal cutoff includes:

a first permanent failure mechanism having a moveable component and a switch separated by a removable nonconductive block and having an open state and closed state where the closed state allows electrical communication between the first terminal and a second terminal; and a battery management system electrically-coupled to a third terminal of the first thermal cutoff, the first terminal and the third terminal are electrically coupled via the second terminal;

a second thermal cutoff in serial electrical communication with the second battery cell and in parallel with the first thermal cutoff, the second thermal cutoff having at least three terminals where a first terminal of the second thermal cutoff is connected to the second battery cell, where the second thermal cutoff includes:

a second permanent failure mechanism having an open state and closed state where the closed state allows electrical communication between the first terminal and a second terminal.

21. The battery of claim 20, wherein the battery does not include a fuse in series between the first thermal cutoff and the first battery cell.

* * * * *